United States Patent [19]

Nicolet

[11] 4,264,447
[45] Apr. 28, 1981

[54] ULTRAFILTRATION MEMBRANE ASSEMBLY AND BONDING PROCESS THEREFOR

[75] Inventor: Robert D. Nicolet, Weston, Conn.

[73] Assignee: Dorr-Oliver Incorporated, Stamford, Conn.

[21] Appl. No.: 52,445

[22] Filed: Jun. 26, 1979

[51] Int. Cl.³ .............................................. B01D 39/16
[52] U.S. Cl. ................................ 210/500.2; 156/290; 428/194; 428/198
[58] Field of Search ............... 210/23 F, 23 R, 321 R, 210/344, 445, 450, 500 M, 433 M; 156/290; 264/41; 428/194, 198

[56] References Cited

U.S. PATENT DOCUMENTS

| | | | |
|---|---|---|---|
| 2,729,010 | 1/1956 | Markus et al. | 156/290 X |
| 3,993,566 | 11/1976 | Goldberg et al. | 210/500 MX |
| 4,003,777 | 1/1977 | Eddy | 156/290 X |
| 4,120,715 | 10/1978 | Ockwell et al. | 156/290 X |

Primary Examiner—S. Leon Bashore
Assistant Examiner—Ferris H. Lander
Attorney, Agent, or Firm—Harold M. Snyder; Burtsell J. Kearns

[57] ABSTRACT

An ultrafiltration membrane assembly comprising an ultrafiltration membrane, a coarse fabric drainage mat and an impervious backing plate are heat sealed at the edges of the assembly.

5 Claims, 1 Drawing Figure

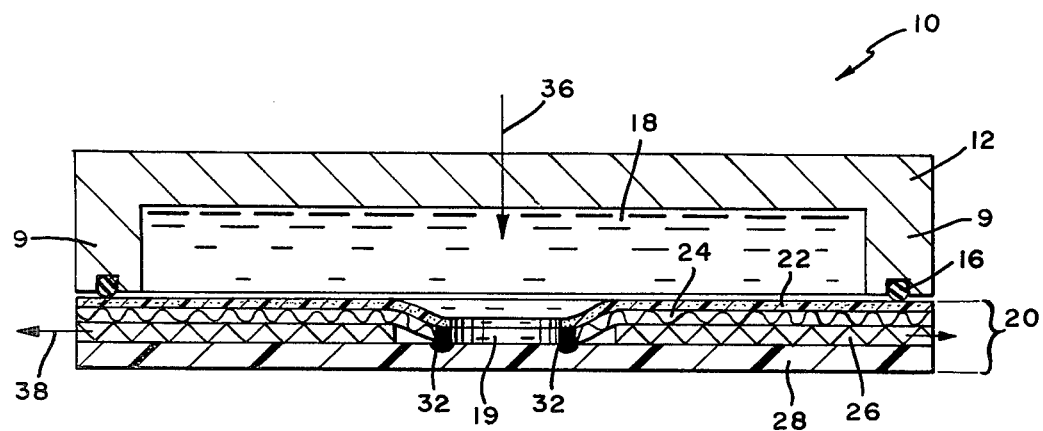

ULTRAFILTRATION MEMBRANE ASSEMBLY AND BONDING PROCESS THEREFOR

This invention is directed to an ultrafiltration membrane assembly having an improved edge seal.

Ultrafiltration membranes are very thin sheets of material usually cast on supporting porous sheets or substrates. The membrane, in itself, is quite a delicate member, subject to wrinkling and tearing when mechanical forces are applied in forming seals in ultrafiltration assemblies. The materials from which membranes are made and the extreme thinness of the membranes, make them very sensitive to the heat required to form heat seals in assemblies. Thus, in efforts to form heat bonded joints with relatively heavy backing plates, while the membrane substrate has been bonded to the backing plate, it has been found that the heated area of the membrane melts or degrades at the temperatures applied, and it has been necessary to recast the membrane on its substrate after heat bonding.

The ultrafiltration membranes of particular interest here are anisotropic, microporous, polymeric, high flux, low pressure membranes of the general character disclosed in U.S. Pat. No. 3,615,024, issued Oct. 26, 1971 in the name of A. S. Michaels. This special membrane has a layered structure. An extremely thin layer or skin, about 0.1 micron to about 10 microns in thickness composed of a homogeneous polymer is integral with a thicker layer about 20 microns to about 1 millimeter or more in thickness of a microporous open-celled polymer. Average pore diameter of this microporous layer is in the millimicron range; for example, from 1 to 1000 millimicrons; i.e., about 0.1 to 0.01 the thickness of the skin. The fragile membrane is supported on a highly porous substrate in use.

It is the object of this invention to provide an ultrafiltration membrane assembly having an improved edge seal.

Other objects and advantages of the invention will be manifest to those skilled in the art from the following description taken in conjunction with the accompanying drawing in which the FIGURE discloses a test cell in which the edge seal of the invention is shown.

The present invention contemplates a composite ultrafiltration membrane assembly and a process for making such an assembly, said assembly comprising a thin anisotropic ultrafiltration membrane composed of a polymer having a relatively high polymer melt temperature, said anisotropic membrane being mechanically joined to a porous polymer support sheet or scrim which fuses at a temperature below the polymer melt temperature of said membrane, said mechanical joint having been formed by casting the membrane on the porous support sheet, a relatively thick, impervious backing plate composed of a polymer which fuses at a temperature below the polymer melt temperature of said membrane, a coarse-textured drainage mat interposed between and separating said porous support sheet from said impervious backing plate except at selected edges of the assembly where said porous support sheet contacts said backing plate and a heat and pressure bonded joint at said selected edges wherein said porous support and said impervious backing plate have fused in the joint region and said membrane has compacted in said joint region, said joint region being non-porous in character and providing a seal in said selected edges of said assembly.

Generally speaking, the invention provides a fused bond between porous support sheet and backing plate in which heat traverses the membrane to the fusion zone without fusing the membrane or damaging the mechanical bond between the membrane and its substrate.

Turning to the drawing, the test cell 10 includes a pressure housing 12 having side walls 9 forming a chamber 18 therein which is open at the bottom. The test cell is rectangular when viewed in plan (not illustrated). An ultrafiltration membrane assembly 20 closes the open bottom of chamber 18 and it comprises an ultrafiltration membrane 22 mechanically joined to its porous support member 24. A backing plate 28 is provided for the assembly 20. Between the porous support member 24 and the backing plate 28, a coarse-textured non-woven drainage mat 26, is positioned. An O-ring seal 16 is situated between the ends of side walls 9 and the top of ultrafiltration membrane assembly 20. Clamping means (not shown) compresses O-ring 16 into sealing engagement with the ultrafiltration membrane assembly 20. The elements 22, 24 and 26 of the ultrafiltration membrane assembly are pierced through at the center thereof and the edges of the hole 19 so formed have been heat and pressure bonded at joint 32.

In the ultrafiltration membrane assembly illustrated, the membrane is composed of a relatively high temperature polyethersulfone polymer having a polymer melt temperature in excess of 150° C. Such a polyethersulfone polymer is sold uner the trademark VICTREX by the ICI Corporation. The polymer melt temperature of this product is in the range from about 340° C. up to about 400° C. The membrane is cast from a solution of the polyethersulfone polymer in sheet form on a polyethylene paper using methods well known in the art, see the above mentioned Michaels' patent. The polyethylene paper on which the ultrafiltration membrane is cast is spun bound from filamentous polyethylene. A satisfactory polyethylene paper is available, such paper being sold under the trademark TYVEK by the DuPont Corporation. The polymer melt temperature of this polyethylene paper is about 350° F. The drainage mat is a spun bound polypropylene polymer sheet; i.e., a coarse-textured non-woven fabric. Polypropylene polymer sheet sold under the trademark TYPAR by the DuPont Corporation has been found to be suitable for this purpose. The backing plate is a solid, essentially non-porous, talc-filled polyethylene injection molded member. A satisfactory talc-filled polyethylene is sold under the trademark "Plaslode" by the Fiberfil Division of Dart Industries Inc. Pure polyethylene polymer sold under the trademark ALATHON 7040 by the DuPont Corporation has also been found to be quite suitable as material from which this backing plate can be made, as have polypropylene, polysulfone and polyesters. It will be understood that the materials identified by trademark have been found to be satisfactory for the indicated applications but such identification is exemplary only, and it is not intended to exclude similar products of the same or other manufacturers.

In forming the sealing bond, a ring-shaped heated element (at a temperature of about 175° C.) is brought into contact with the assembly at the edges of the central hole thereby raising the temperature in the region of the area to be bonded to the level of from about 135° C. up to 150° C. The heat passes through the membrane to reach the fusible members. At this temperature and under a bonding pressure of 350 psi applied for 15 seconds the members 24 and 28 are fused in the joint area and so bonded together, whereas membrane element 22 is compressed or compacted, without fusion, to collapse and seal the pores therein.

In order to demonstrate that the bond produced in this fashion provides an acceptable seal, the test cell was assembled as in the FIGURE. The chamber 18 was filled with a finely pigmented fluid and a pressure of 60 psi was exerted on the liquid in chamber 18 as indicated by the arrow 36. The pigment itself could not pass through the ultrafiltration membrane element 22, 24 and so a clear, ultrafiltered liquid was expressed through the drainage mat 26 as indicated by the arrow 38. Had there been any leakage in the area of the heat-bonded joint 32 the pigment would have been present in the effluent 38. After disassembly of the test cell, the bond 32 and the adjacent region of the ultrafiltration membrane assembly elements were carefully examined under the microscope. There was no evidence of pigment penetration into the area of the bond 32 or the region immediately adjacent to the bond in the elements 24 or 28. Superficial pigment penetration was noted in the edge of element 22 above the bonded joint 32. No pigment was observed in element 26.

The bonded joints of this invention may be employed in forming ultrafiltration membrane plates of the type disclosed in copending U.S. Patent Application Ser. No. 1,727, filed Jan. 8, 1979 in the names of P. J. Hubbard and E. L. Sandstrom.

The pressure applied to the joint must be sufficient to assure intimate contact of the elements to be joined. The actual bonding pressure used will depend on the properties of the materials undergoing bonding. In some cases 5 psi or less is sufficient and, in other cases, pressures up to 500 psi may be required. The time period during which heat and pressure are applied to form the bond will depend on the materials involved and the magnitude of the temperature and pressure employed, varying from a few seconds up to one-half minute or more.

Although the present invention has been described in conjuction with preferred embodiments, it is to be understood that modifications and variations to be resorted to without departing from the spirit and scope of the invention as those skilled in the art will readily understand. Such modifications and variations are considered to be within the purview and scope of the invention and appended claims.

I claim:

1. A composite ultrafiltration membrane assembly comprising,
   a thin anisotropic ultrafiltration membrane composed of a polymer having a relatively high polymer melt temperature,
   said anisotropic membrane being mechanically joined to a porous polymer support sheet which fuses at a temperature below the polymer melt temperature of said membrane,
   mechanical joint between said membrane and said support sheet having been formed by casting the membrane on the porous support sheet,
   a relatively thick, impervious backing plate composed of a polymer which fuses at a temperature below the polymer melt temperature of said membrane,
   a coarse-textured fabric mat interposed between and separating said porous support sheet from said impervious backing plate except at selected edges of the assembly where said porous support sheet contacts said backing plate, and
   a heat and pressure bonded joint at said selected edges wherein said porous support and said impervious backing have fused in the joint region and said membrane has compacted in said joint region,
   said joint region being non-porous in character and providing a seal in said selected edges.

2. The composite ultrafiltration membrane assembly of claim 1 wherein said membrane is composed of a polyethersulfone polymer having polymer melt temperature over 150° C.

3. The composite ultrafiltration membrane assembly of claim 2 wherein said porous support sheet is composed of a polyethylene polymer having a polymer melt temperature of up to 150° C.

4. The composite ultrafiltration membrane assembly of claim 3 wherein said backing plate is composed of a talc-filled polyethylene polymer having a polymer melt temperature of up to 150° C.

5. A composite ultrafiltration membrane assembly comprising,
   a thin anisotropic ultrafiltration membrane composed of a polymer having a polymer melt temperature over 150° C.,
   said anisotropic membrane being mechanically joined to a porous polymer support sheet having a polymer melt temperature below that of said membrane,
   said mechanical joint between said membrane and said support sheet having been formed by casting the membrane from solution onto said porous support sheet,
   a relatively thick, impervious backing plate composed of a polymer having a polymer melt temperature below that of said membrane,
   a coarse-textured fabric mat interposed between and separating said porous support sheet from said impervious backing plate except at selected edges of the assembly where said porous support sheet contacts said backing plate, and
   a heat and pressure bonded joint at said selected edges wherein said porous support and said impervious backing plate are fused in the joint region and said membrane is of compacted structure in said joint region thereby eliminating the porosity thereof,
   said joint region being non-porous in character and providing a seal in said selected edges.

* * * * *